United States Patent [19]

Reichardt et al.

[11] Patent Number: 5,796,093
[45] Date of Patent: Aug. 18, 1998

[54] RECEPTACLE FOR A CHIP CARD

[75] Inventors: Manfred Reichardt, Weinsberg; Robert Bleier, Bad Wimpfen, both of Germany

[73] Assignee: Amphenol-Tuchel Electronics GmbH, Heilbronn, Germany

[21] Appl. No.: 613,178

[22] Filed: Mar. 8, 1996

[30] Foreign Application Priority Data

Mar. 10, 1995 [DE] Germany ............ 195 08 363.6

[51] Int. Cl.$^6$ ............................................. G06K 19/067
[52] U.S. Cl. .................................... 235/492; 235/441
[58] Field of Search ............................ 235/441, 492

[56] References Cited

U.S. PATENT DOCUMENTS

| | | | |
|---|---|---|---|
| 3,917,372 | 11/1975 | Selinko | 339/75 M |
| 4,236,667 | 12/1980 | Crowley et al. | 235/443 |
| 4,288,140 | 9/1981 | Griffith et al. | 339/74 R |
| 4,575,703 | 3/1986 | Shishido | 235/479 |
| 4,717,817 | 1/1988 | Grassi et al. | 235/441 |
| 4,724,310 | 2/1988 | Shimamura et al. | 235/483 |
| 4,734,567 | 3/1988 | Hansbauer | 235/482 |
| 4,735,578 | 4/1988 | Reichardt et al. | 439/152 |
| 4,752,234 | 6/1988 | Reichardt et al. | 439/260 |
| 4,770,639 | 9/1988 | Lau | 439/61 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 235/482 |
| 4,874,323 | 10/1989 | Shibano | 439/260 |
| 4,900,273 | 2/1990 | Pernet | 439/630 |
| 4,932,889 | 6/1990 | Bleier et al. | 439/260 |
| 4,975,086 | 12/1990 | Reichardt et al. | 439/629 |
| 4,976,630 | 12/1990 | Schuder et al. | 439/260 |
| 5,003,520 | 3/1991 | Grieu | 235/380 |
| 5,196,680 | 3/1993 | Schuder | 235/449 |
| 5,259,777 | 11/1993 | Schuder et al. | 439/188 |
| 5,269,707 | 12/1993 | Reichardt et al. | 439/630 |
| 5,320,552 | 6/1994 | Reichardt et al. | 439/331 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,369,259 | 11/1994 | Bleier et al. | 235/441 |

FOREIGN PATENT DOCUMENTS

| | | |
|---|---|---|
| 139 593 | 5/1985 | European Pat. Off. . |
| 0 186 737 | 7/1986 | European Pat. Off. . |
| 214 478 | 3/1987 | European Pat. Off. . |
| 0 254 316 | 1/1988 | European Pat. Off. . |
| 274 534 | 7/1988 | European Pat. Off. . |
| 316 699 | 5/1989 | European Pat. Off. . |
| 0 333 530 | 9/1989 | European Pat. Off. . |
| 2 489 558 | 3/1982 | France . |
| 2 607 287 | 5/1988 | France . |
| 2 633 750 | 1/1990 | France . |
| 2952442 A1 | 7/1980 | Germany . |
| 3343727 A1 | 6/1985 | Germany . |
| 3343757 A1 | 6/1985 | Germany . |
| 3402632 A1 | 8/1985 | Germany . |
| 3443561 A1 | 5/1986 | Germany . |
| 3531318 A1 | 3/1987 | Germany . |
| 36 02 668 A1 | 7/1987 | Germany . |
| 3602668 A1 | 7/1987 | Germany . |
| 3625306 A1 | 1/1988 | Germany . |
| 3442397 A1 | 5/1988 | Germany . |
| 38 08 183 | 9/1988 | Germany . |
| 3810275 A1 | 10/1989 | Germany . |
| 3832588 A1 | 3/1990 | Germany . |
| 3931506 A1 | 4/1991 | Germany . |
| 41 38 342 A1 | 5/1992 | Germany . |
| 37 17 684 C2 | 8/1993 | Germany . |

OTHER PUBLICATIONS

Abstract of Japanese Published Pat. Appln. No. 60–022795, *Patent Abstracts of Japan*, Feb. 5, 1985.

IBM Technical Disclosure Bulletin, vol. 20, No. 5, Oct. 1977, "Actuator Assembly for a Disk File".

*Primary Examiner*—Harold Pitts
*Attorney, Agent, or Firm*—Bacon & Thomas

[57] ABSTRACT

The invention relates to a housing for receiving a chip card, especially a SIM card, into a hand telephone.

9 Claims, 1 Drawing Sheet

RECEPTACLE FOR A CHIP CARD

BACKGROUND OF THE INVENTION

1. Technical Field of the Invention

The invention relates to a housing for receiving a chip card, in which the housing is a component of a chip card reader which performs the task of moving the contacts of the electronic chips arranged on the card to a defined end position inside the reader to permit reading of the information on the chip, as well as an input of information into the card card if necessary.

2. Description of the State of the Aart

Chip card readers or their housings are widely used, for example, in so-called stationary card telephones, and also in mobile telephones (so-called "handys"), automatic teller machines, etc.

Chip cards of this kind are presented in the form of "normal cards," but reduced-size cards, so-called SIM cards, are also known. The SIM cards are used mostly for the digital nets of hand telephones and are only 1/10 of the size of a normal card defined according to an ISO standard. A reduction in the size of the hand telephone is made possible thereby, but because of the small size of the SIM, insertion of the card into the reader is difficult, and the contact established inside the reader by known arrangements is quite unacceptable.

A housing for inserting SIM cards that has a "flap-push cover" is known. However, sufficient space, often not available in hand telephones, must be provided for the pivoting movement of the cover required for inserting and removing the card.

Housings (readers) with loose card insertions are also known. For inserting or removing the SIM card, the housing where the card is inserted must be taken completely out of the guide and could be lost.

SUMMARY OF THE INVENTION

The object of the invention is to provide a housing for inserting (receiving) a chip card, especially a SIM card as used in hand telephones, which requires little space, in which the chip card can be inserted and removed easily and can be contacted and held securely in its operating position.

For attaining this object, the invention proposes a housing for receiving a chip card, especially a SIM card as used in a hand telephone, which has the following features:

- a guide slot for the chip card,
- a contact carrier provided in a portion of the housing body which forms one side of the guide slot, wherein
  - the guide slot formed between the portion of the housing body and a cover part which can be pushed into and pulled out of the housing body along a substantially linear path and
  - the cover part has an indentation at its front edge to form permitting a card situated therein to be grasped.

Such a housing for inserting a chip card can be provided, for example, on the bottom part of a hand telephone. For inserting the card, the movable cover part is pulled off in a manner that will be described later, so that it protrudes beyond the bottom part of the hand telephone. Now the SIM card can be pushed through the insertion opening along the guide track and the cover part is then guided back into its "function position," that is, it is pressed into the bottom part of the handy until its front edge is in alignment with the neighboring components of the hand telephone.

In this "function position," which corresponds to the "read position" of the SIM card inside the reader, there are no housing parts that protrude out of the telephone housing. But at any time a removal or substitution of the SIM card is possible, and this carried out as follows:

The cover part is shaped so that its width is less than a corresponding insertion opening in the housing of the telephone, so that at least an "opening" is provided on the (narrow) side of the cover part between the cover part and the housing into which a tool, for example, a ballpoint pen, can be guided for removing the cover part and guiding it out of its "read position," and then for removing the card along the mentioned indentation above the insertion opening of the cover part.

Knob-shaped protrusions that are easy to grasp with the above-mentioned tool can be installed on one or both sides to ease the removal of the cover part.

The housing of the invention has an extremely small shape and has the further advantage of being integrated into the telephone housing, and is, thus, encompassed on all sides by said housing. Consequently, mechanical defects in the area of the contact carrier are also avoided.

In one embodiment, the positioning of the cover part in the "read position" is carried out under contact friction so that the cover part is pushed onto the corresponding housing body by contact friction and is removed by overcoming the contact friction.

In this way, there is no need for additional tools. If the described side gap between the cover part and the telephone housing is large enough, the cover part can even be removed with a finger.

The shape of the cover part can be adapted to local needs. One particularly simple embodiment provides a cover part in the shape of a U-shaped section, and the free U-legs are then guided longitudinally along corresponding grooves in the housing body.

As can already be seen in the foregoing description of the structure of the housing for inserting a chip card as well as of its functional features, the contacts are made up of so-called "sliding contacts," such, that the contact strips are guided in a "sliding contacts" manner over the corresponding contacts of the contact carrier. Usually, the contacts of the contact carrier are biased to protrude into the guide track, so that they are pushed away during insertion of the card in order to obtain a secure contact. However, after repeated card exchange, a "relaxation" of the pre-tension area of the sliding contacts of the contact carrier may occur. A further embodiment of the invention provides a pre-tensed tension clamp in the housing, the clamp acting on the cover part in the area of the contact carrier to push the cover part towards said contact carrier.

In other words: the tension clamp exerts an additional pressure on the cover, which passes from the cover onto the card, and from the card onto the contacts of the contact carrier, so that faulty contacts are avoided.

To optimize this pressure, the cover part can be weakened along the section on which the tension clamp acts so that the cover part is "arched" in the direction of the guide track within small boundaries.

By arranging the tension clamp in this manner, it also becomes possible to attach the clamp to a circuit board that can be connected to the corresponding contact carrier. It was discovered that the placement of the contact carrier on the circuit board sometimes causes problems because of limited space. If the whole housing, and with it, the contact carrier, can be attached, (for example, soldered) to the board by means of the tension clamp, then the operational safety of the device as a whole is increased.

The tension clamp can then, for example, be U-shaped, which permits it to encompass the cover part or housing body on three sides and which allows the circuit board to be attached by means of those free ends of the clamp that can be bent, as necessary. Attaching the tension clamp only to the housing body is also possible.

Further features of the invention result from the features of the depending claims as well as of other application documents.

BRIEF DESCRIPTION OF THE FIGURES OF DRAWING

The invention will be explained further by means of an embodiment, wherein.

DETAILED DESCRIPTION OF THE PREFERRED EMBODIMENT

Figure 1:
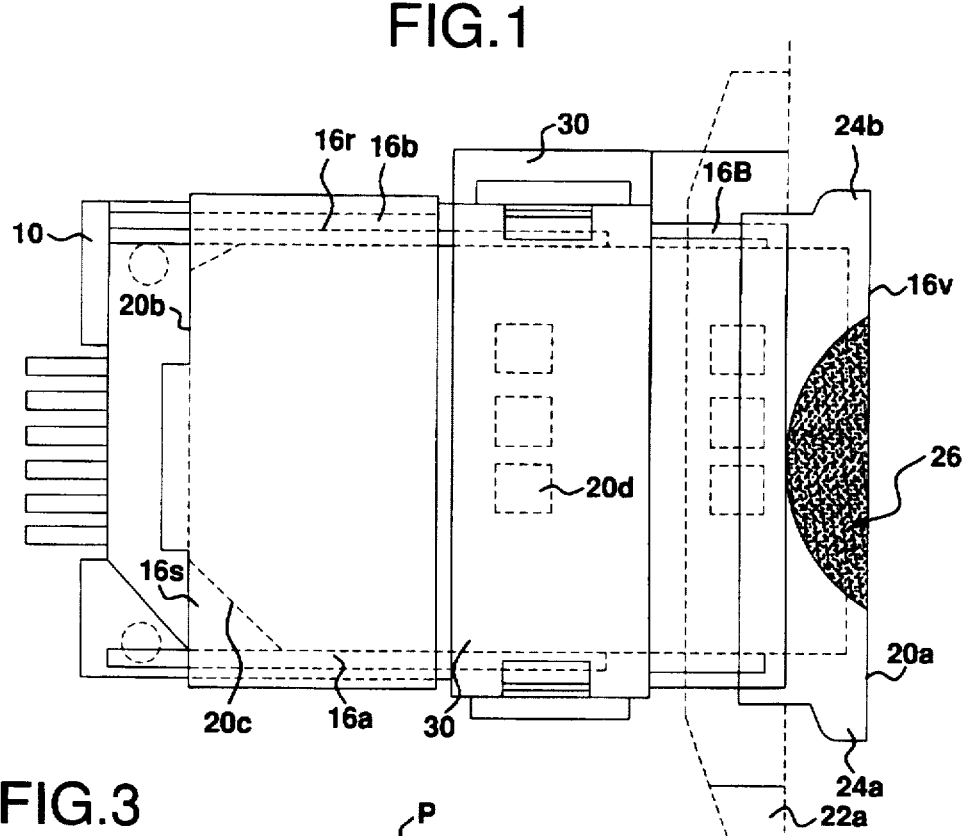
FIG. 1 is a view of a housing with a removed cover part.

The housing body of the housing for inserting SIM cards in hand telephones is referred to with the numeral 10. The housing body 10 has lateral grooves 12, 14 running in a longitudinal direction in which vertical legs 16a, b of a cover part 16 are guided. Cover part 16 has a front end 16v and a rear part 16r with a rear edge 16s.

By these features, a slot into which the card is inserted 18 for the SIM card 20 is formed between the cover 16 and the housing body 10, whereby the width of the guide slot 18 is equal to or slightly larger than the width of the SIM card 20 and the distance between the cover part 16 and the housing part 10 is equal or slightly larger than the thickness of the SIM card 20, as further described hereinafter.

Figure 2:
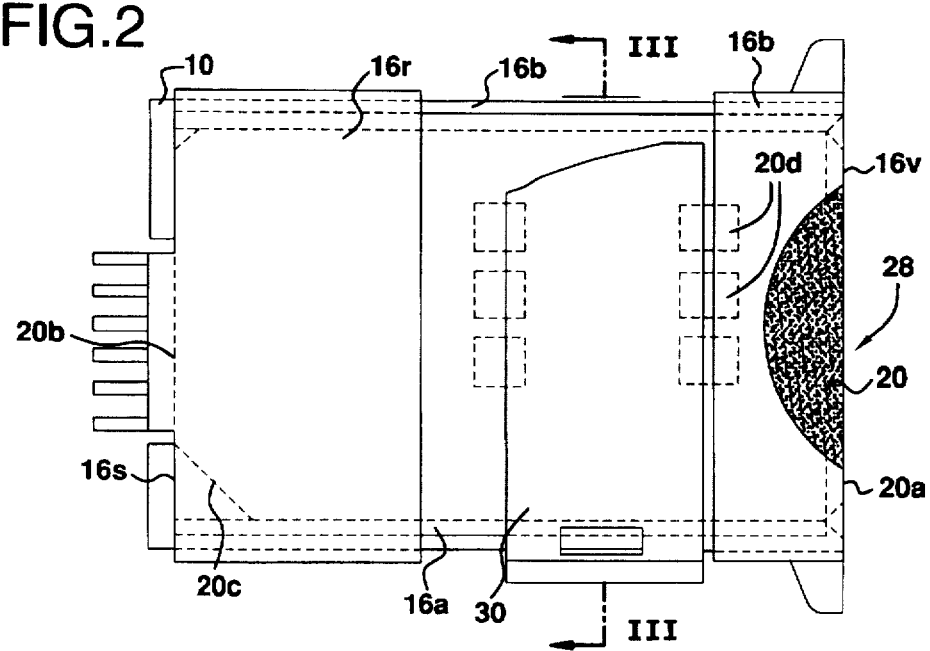
FIG. 2 is a view of the housing of FIG. 1 with an inserted cover, i.e. a cover in the read position.

The cover part 16 is linearly guided longitudinally by its legs 16a, 16b along the grooves 12, 14 within the housing body 10, that is, between the open positions shown in FIGS. 1 and the closed position shown in FIG. 2.

FIG. 1 shows the cover part 16 in a position from which the card 20 can be removed, the cover part 16 having been extracted along the boundary line 22, shown here in dashes, from a corresponding telephone housing toward the front (in FIG. 1: to the right). For this purpose, the user pulls out the cover part 16 by means of a pointed object inserted behind one or two of the knob-like side protrusions 24a, 24b on the narrow side of the cover part 16. As can be seen in FIGS. 1 and 2, the cover part 16 has an indentation 26, starting at its front edge 16v, which permits the SIM card 20 having front edge 20a, rear 20b, notch 20c, and contacts 20d, and represented in the area of the indentation by crossed lines, to be gripped easily and pulled out of the housing.

To insert a new SIM card, the card is pushed between the cover part 16 and the housing body 10 into the slot 18 and then displaced together with the cover part 16 relative to the housing body 10 until the cover part 16 reaches its end position, as shown in FIG. 2, which corresponds to the read position of the chip card. The positioning of the cover part 16 with respect to the housing body 10 is carried out by contact friction.

In the read position, the contacts of the SIM card 20 lie opposite the contacts of the contact carrier which are integrated in the housing body 10, and the electric connection between the contacts is realized by an end position switch (not shown).

Figure 3:
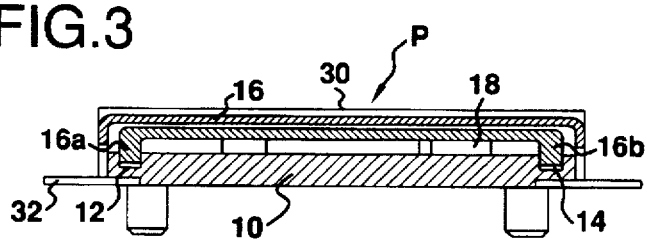
FIG. 3 is a longitudinal section taken along line III—III through the housing in the region of the contact carrier.

A tension clamp 30 runs over the cover part 16 between the front edge 16v and the rear part 16r of the cover part 16 so as to optimize the contact 20d on the card and those in the reader between the contacts because the tension clamp 30 is pre-tensioned and presses onto the center, as indicated by arrow P in FIG. 3 of the cover part 16, which is weakened in this region. Only a portion of clamp 30 is shown in FIG. 2, the portion at the top of FIG. 2 having been omitted for clarity.

As can be seen in FIG. 3, the tension clamp 30 is U-shaped and runs around the cover part 16 and is soldered with its free ends onto a printed circuit board, here referred to by the numeral 32, which is attached to the housing body 10.

The insertion housing represented is—as explained— attached to the bottom of a hand telephone, whereby the bottom of the hand telephone is modified to include the features of the housing, and has gaps 22a in the region of the insertion opening 28 which are laterally positioned beside the knob-like protrusions 24a, b of the cover part 16, so as to allow for grasping of the protrusions 24a, b via these gaps 22a in the manner described previously in order to remove the cover part 16 from the telephone housing from its bottom 22.

We claim:

1. A housing for receiving a chip card insertable into a hand telephone, comprising:

a housing body; and a cover part arranged to be moved substantially linearly into and out of said housing body, said cover part serving as a carrier for the chip card, wherein said cover part forms one side of a guide slot for said chip card such that the chip card is guided between the cover part and the housing body as the cover part is moved into the housing body, and wherein the cover part includes an indentation arranged to permit the card to be grasped when it situated in said guide slot in order move the card and the cover part into and out of the reading position.

2. A housing as claimed in claim 1, wherein said chip card is a SIM card.

3. A housing as claimed in claim 2, wherein the cover part can be pulled out of the housing body by contact friction between the card and the cover part as the card is pulled out of said guide slot.

4. A housing as claimed in claim 2, wherein the cover part has a U-shape, and wherein legs of the U-shape are slidable within grooves arranged to guide the cover part into and out of the housing body.

5. A housing as claimed in claim 2, further comprising a tension clamp attached to the housing body, said tension clamp being arranged to press on the cover part in a region of the cover part at which contacts of the chip card are located when the chip card is inserted into said guide slot.

6. A housing as claimed in claim 5, wherein the cover part is weakened in said region of the cover part.

7. A housing as claimed in claim 5, wherein the tension clamp is attached to a printed circuit board attached to contacts engageable with the contacts of the chip card.

8. A housing as claimed in claim 5, wherein the tension clamp is U-shaped and fits over three sides of the cover part, the ends of the legs of the U-shaped being affixed to one of the housing body or a printed circuit board.

9. A housing as claimed in claim 1, wherein the indentation is semicircular.

* * * * *

UNITED STATES PATENT AND TRADEMARK OFFICE
CERTIFICATE OF CORRECTION

PATENT NO.  :  5,796,093
DATED       :  August 18, 1998
INVENTOR(S) :  Reichardt et al.

It is certified that error appears in the above-identified patent and that said Letters Patent is hereby corrected as shown below:

Column 1, line 12, delete "card", second occurrence.

Column 1, line 13, change "Aart" to --Art--.

Signed and Sealed this

Twentieth Day of April, 1999

Attest:

Q. TODD DICKINSON

*Attesting Officer*     Acting Commissioner of Patents and Trademarks